(12) United States Patent
Kawai et al.

(10) Patent No.: US 11,577,716 B2
(45) Date of Patent: Feb. 14, 2023

(54) CART, WORK MACHINE, AND TRAVEL SYSTEM

(71) Applicant: HONDA MOTOR CO., LTD., Tokyo (JP)

(72) Inventors: Toru Kawai, Wako (JP); Masaya Honji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 17/181,170

(22) Filed: Feb. 22, 2021

(65) Prior Publication Data

US 2021/0276533 A1 Sep. 9, 2021

(30) Foreign Application Priority Data

Mar. 9, 2020 (JP) .............................. JP2020-039907

(51) Int. Cl.
*B60W 20/13* (2016.01)
*B60L 53/00* (2019.01)

(52) U.S. Cl.
CPC ............. *B60W 20/13* (2016.01); *B60L 53/00* (2019.02)

(58) Field of Classification Search
CPC .......... B60W 20/13; B60L 53/00; B60L 50/61
See application file for complete search history.

(56) References Cited

U.S. PATENT DOCUMENTS

| 2013/0314034 | A1* | 11/2013 | Ang | H02J 7/1438 320/137 |
| 2014/0288763 | A1* | 9/2014 | Bennett | B62D 55/10 180/9.5 |
| 2018/0134206 | A1* | 5/2018 | Grivetti | B62D 25/2009 |
| 2018/0173223 | A1* | 6/2018 | Doane | G01C 21/20 |

FOREIGN PATENT DOCUMENTS

| JP | 2000-355402 A | 12/2000 |
| JP | 2006-146376 A | 6/2006 |

* cited by examiner

*Primary Examiner* — Erez Gurari
(74) *Attorney, Agent, or Firm* — Thomas | Horstemeyer, LLP

(57) ABSTRACT

There is provided a cart. An electric motor generates a travel driving force based on a control signal from an external control unit configured to perform control related a travel path of the cart. A battery supplies power to the electric motor. An engine drives a power generator which is configured to be capable of charging the battery. A determination unit determines whether the engine is to be operated, based on a predetermined condition.

16 Claims, 6 Drawing Sheets

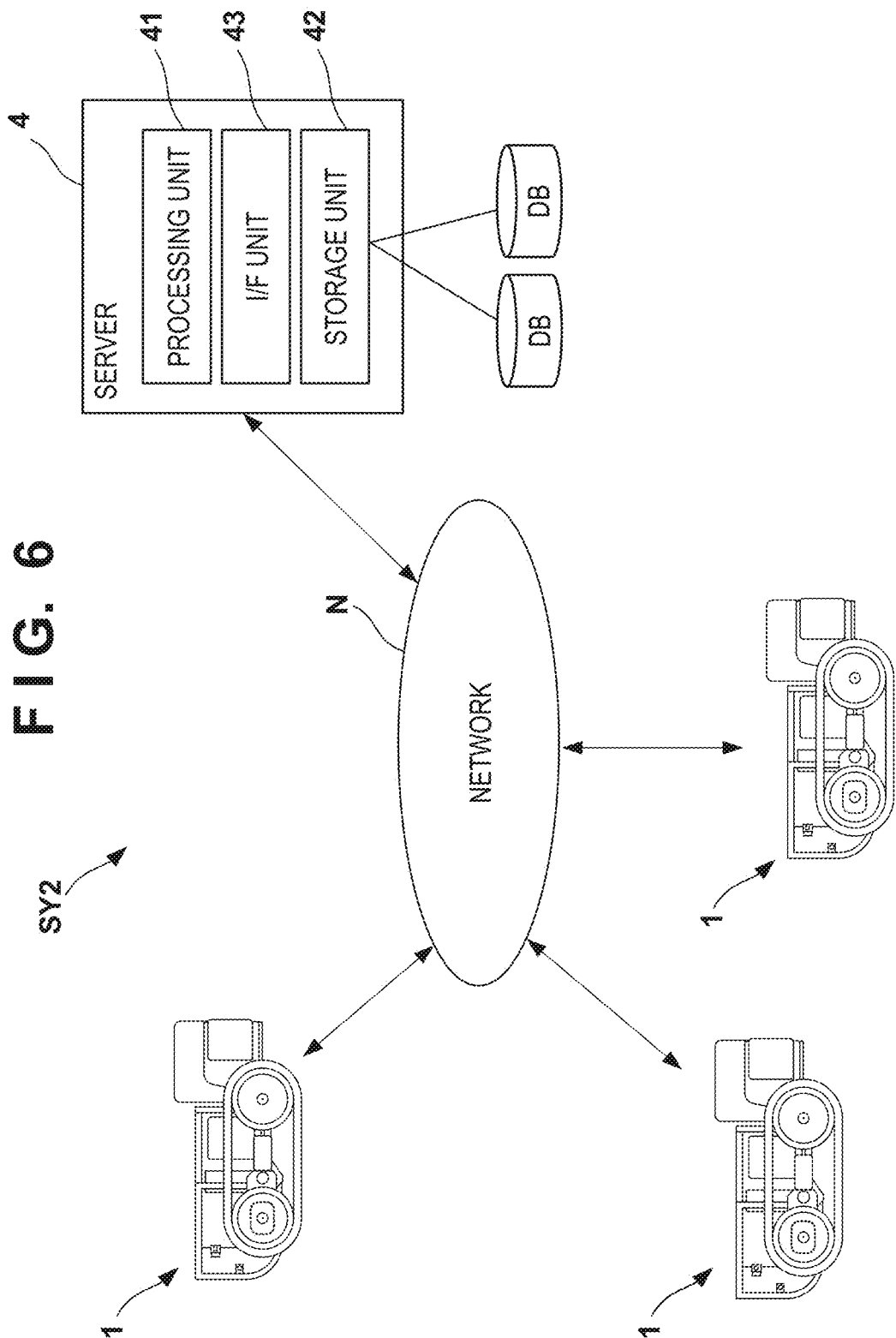

CART, WORK MACHINE, AND TRAVEL SYSTEM

CROSS-REFERENCE TO RELATED APPLICATION

This application claims priority to and the benefit of Japanese Patent Application No. 2020-039907 filed on Mar. 9, 2020, the entire disclosure of which is incorporated herein by reference.

BACKGROUND OF THE INVENTION

Field of the Invention

The present invention relates to a cart, a work machine, and a travel system.

Description of the Related Art

Control performed when a traveling body such as a cart, a work machine, or the like is traveling is known. As an example, an autonomous mobile robot disclosed Japanese Patent Laid-Open No. 2006-146376 determines whether to stop or continue traveling in accordance with the tilt of the floor in the frontward direction. Also, in another example, an automated guided vehicle disclosed in Japanese Patent Laid-Open No. 2000-355402 includes a motor for driving and an engine for driving a power generator for battery charging, drives only the motor when the self-vehicle is indoors, and drives also the engine when the self-vehicle is outdoors.

SUMMARY OF THE INVENTION

According to one embodiment of the present invention, there is provided a cart comprising: an electric motor configured to generate a travel driving force based on a control signal from an external control unit configured to perform control related a travel path of the cart; a battery configured to supply power to the electric motor; an engine configured to drive a power generator which is configured to be capable of charging the battery; and a determination unit configured to determine whether the engine is to be operated, based on a predetermined condition.

According to another embodiment of the present invention, there is provided a work machine comprising: a cart defined in the above embodiment; and a work unit mounted on the cart and configured to perform a predetermined task.

According to still another embodiment of the present invention, there is provided a travel system that comprises a cart and an external control unit configured to perform control related to a travel path of the cart, wherein the cart comprises an electric motor configured to generate a travel driving force based on a control signal from the external control unit, a battery configured to supply power to the electric motor, an engine configured to drive a power generator which is configured to be capable of charging the battery, and a determination unit configured to determine whether the engine is to be operated based on a predetermined condition.

BRIEF DESCRIPTION OF THE DRAWINGS

FIG. 6 is a schematic view showing an example of a travel system using a cart shown in FIG. 1.

DESCRIPTION OF THE EMBODIMENTS

Figure 1:
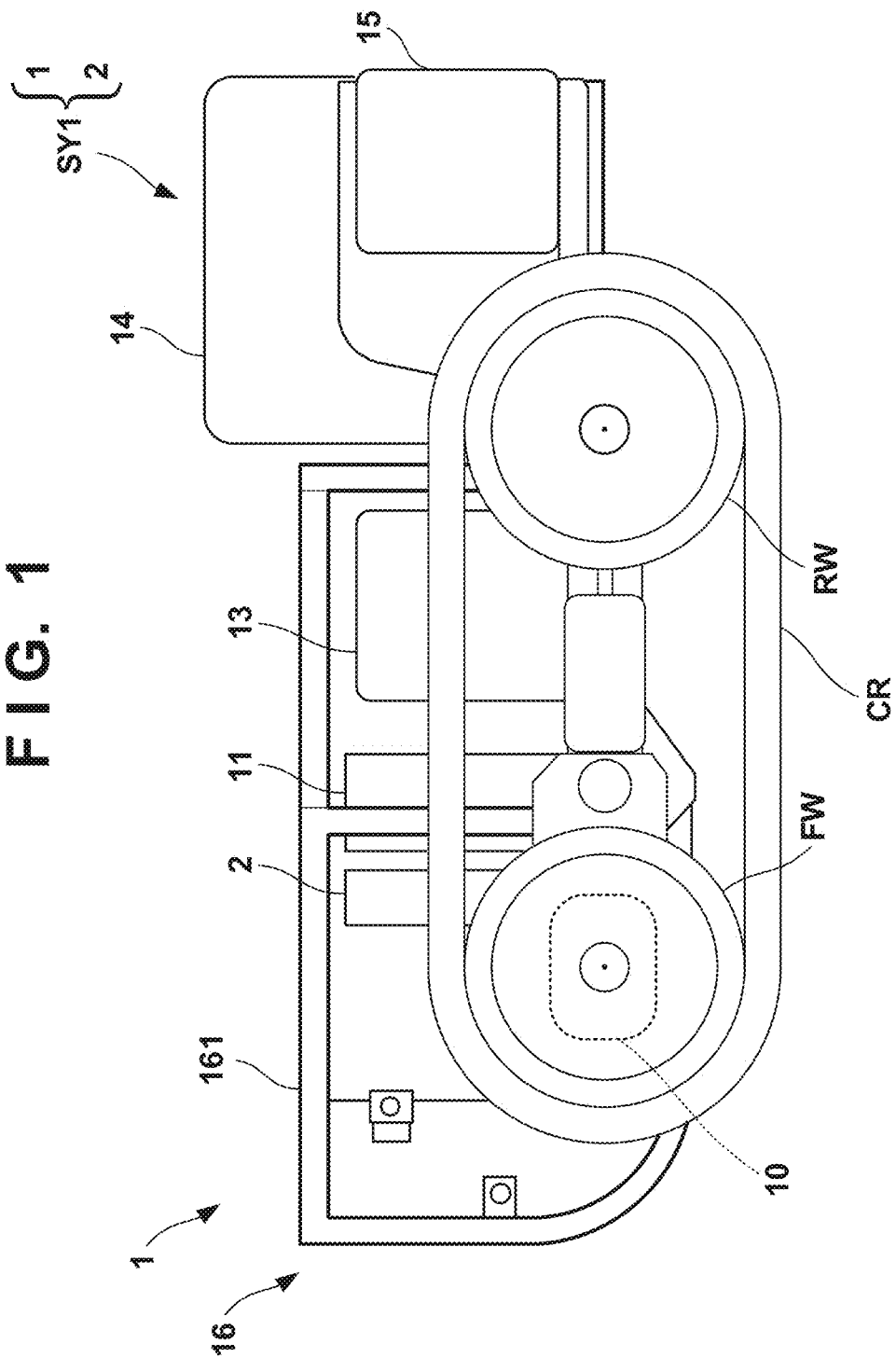
FIG. 1 is a schematic view of a travel system according to an embodiment.

In a cart or the like that includes a motor for driving and an engine for power generation, the travel of such a cart or the like may be controlled based on a control signal from an external control unit which can be arranged independently of such a cart. A control signal from an autonomous control device that sets the route of the cart or the like, a control signal from a controller used when a user is to remotely control the cart, and the like are examples of control signals to be transmitted from a control unit. In such a cart or the like, there is a demand for the operation of the engine to be controlled more effectively.

An embodiment of the present invention provides a technique for controlling the operation of an engine more effectively.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<Outline of Travel System>

Figure 2:
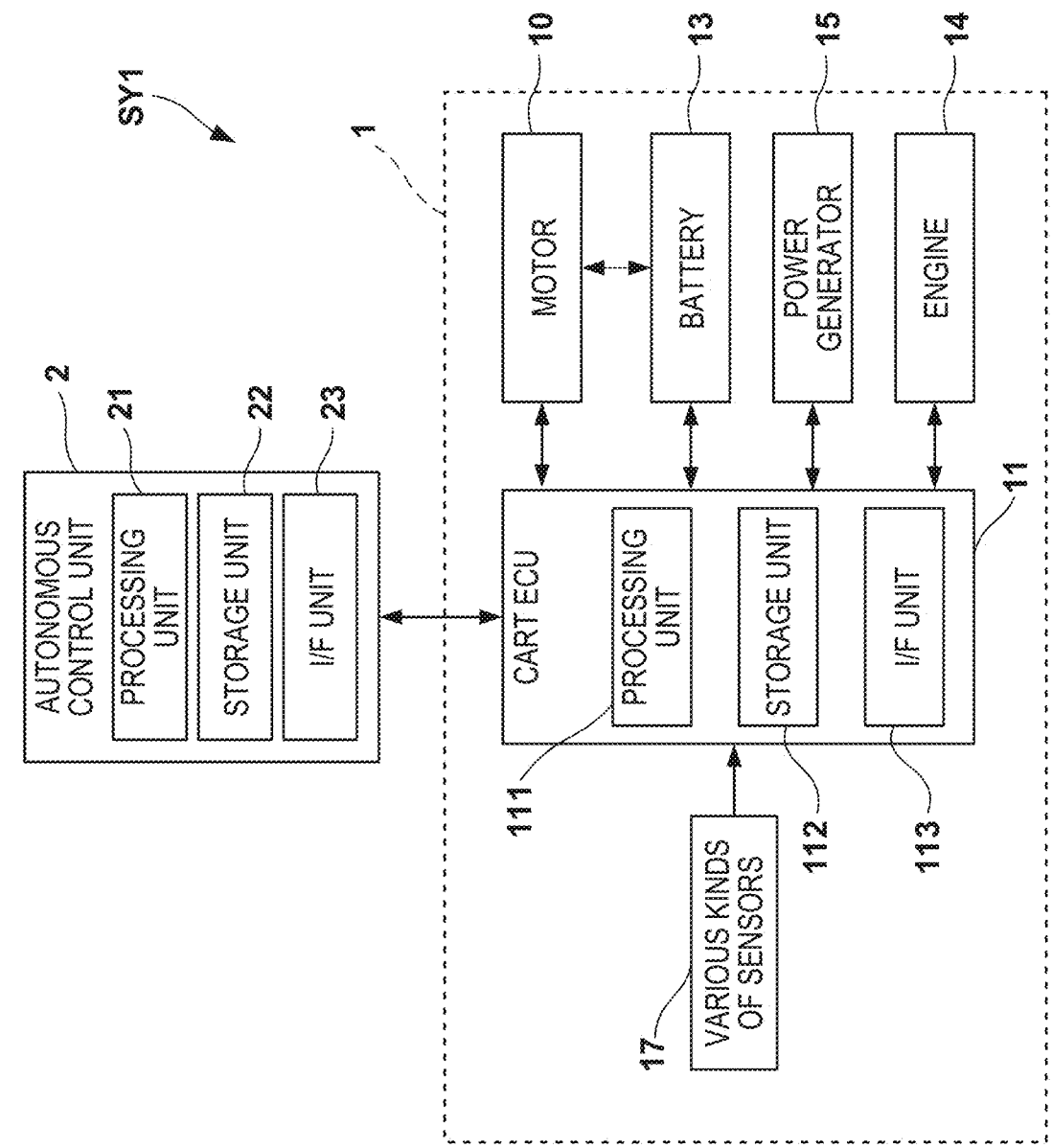
FIG. 2 is a block diagram showing the hardware arrangement of the travel system shown in FIG. 1.

FIG. 1 is a view showing the left side of a system SY1 according to an embodiment. FIG. 2 is a block diagram showing an example of the hardware arrangement of the system SY1. Note that FIGS. 1 and 2 are schematic views and mainly illustrate portions related to features of the embodiment to be described hereinafter.

The system SY1 is a travel system that includes a cart 1 and an autonomous control unit 2 that executes control related to a travel path of the cart 1. In this embodiment, the autonomous control unit 2 can be mounted on the cart 1. For example, the autonomous control unit 2 is supported by a vehicle body frame 16 of the cart 1. As a result, the SY1 system in which the cart 1 and the autonomous control unit 2 are integrally arranged is formed. The autonomous control unit 2 is configured to be capable of communicating with a cart ECU 11 which functions as a body control unit on the side of the cart 1, and transmits a control signal to the cart ECU 11 to control the travel of the cart 1. The autonomous control unit 2 will be described in detail in the section of <Hardware Arrangement>.

<Outline of Cart>

The cart 1 is a hybrid cart. The cart 1 can be used as a conveyance vehicle by arranging a cargo bed or the like or used as a work machine by arranging a component for performing a predetermined task such as a work unit 3 (see FIG. 3). For example, the cart 1 can be used as a snow removal vehicle, a lawn mower, a tiller, or the like. Also, in this embodiment, a control unit that controls the travel of the cart 1 in the manner of autonomous control unit 2 can be mounted on the cart 1. By mounting a control device that allows autonomous control of the cart 1, the cart 1 can be used as a self-driving cart or a work vehicle. In other words, the cart 1 can be regarded as a based portion that can travel while carrying a function unit that exerts a predetermined function.

The cart 1 includes motors 10, the cart ECU 11, a battery 13, an engine 14, and a power generator 15. The cart 1 can also include front wheels FW, rear wheels RW, crawlers CR, and the vehicle body frame 16.

Each motor 10 generates a travel driving force based on a control signal from the autonomous control unit 2 which performs the travel control of the cart 1. In this embodiment, two electronic motors are provided as the motors 10 and control the respective left and right front wheels FW.

The cart ECU 11 receives the control signal from the autonomous control unit 2 and drives components, such the motors 10, the engine 14, and the like of the cart 1. In other words, the cart ECU 11 controls the body of the cart 1 based on the control signal from the autonomous control unit 2. The cart ECU 11 will be described in detail in the section of <Hardware Arrangement>.

The battery 13 supplies power to each motor 10. Although this embodiment will describe a case in which the battery 13 is a lead acid battery, the battery 13 may be another secondary cell battery such as a lithium ion battery or the like. The number of batteries 13 to be incorporated can also be designed appropriately. For example, two lead acid batteries may be connected in series.

The engine 14 drives the power generator 15 that can charge the battery 13. In this embodiment, the engine 14 is provided with a self-starter and can be externally controlled to start by the self-starter and to stop by a kill switch. The power generator 15 generates power by rotating by the driving force of the engine 14. The power generated by the power generator 15 is accumulated in the battery 13. Although the engine 14 is arranged to drive the power generator 15 in this embodiment, the driving force of the engine 14 may be used, as needed, as the driving force for travel of the cart 1. That is, the cart 1 is not limited to a series system and may be a hybrid vehicle adopting another system such as a parallel system, a series-parallel system, or the like.

The front wheels FW, the rear wheels RW, and the crawlers CR can form the travel mechanism of the cart 1. In this embodiment, both a pair of the front wheels FW and a pair of the rear wheels RW are arranged spaced apart from each other on the left and right sides. Also, in each of the left and right sides, one endless crawler CR is wound around the front wheel FW and the rear wheel RW. In this embodiment, the front wheels FW are the driving wheels since each of the left and right front wheels FW is driven by the corresponding one of the motors 10, and the rear wheels RW are the driven wheels which are driven by the front wheels FW via the crawlers CR. However, the cart 1 can also adopt an arrangement in which the rear wheels RW are the driving wheels and the front wheels FW are the driven wheels. Alternatively, a single wheel or three or more wheels may be arranged for the pair of the front wheels FW, the pair of rear wheels RW, or both pairs of the front wheels FW and the rear wheels RW in the cart 1. In addition, the cart 1 can also adopt an arrangement that does not include the crawlers CR.

The vehicle body frame 16 is a member that forms the framework of the cart 1 and is made of, for example, a metal material. The vehicle body frame 16 supports at least some of the components of the cart 1 such as the above-described motors 10, the engine 14, and the like. The vehicle body frame 16 also includes a mounting portion 161 which allows a predetermined mounting component to be mounted on its upper surface.

A cargo bed (not shown) can be mounted on the mounting portion 161 if, for example, the cart 1 is to be used as a conveyance vehicle. As a result, the user or the like can load a cargo onto the cargo bed. Also, a work device, such as a work unit 3 or the like, which is configured to perform a predetermined task can be mounted on the mounting portion 161 if, for example, the cart 1 is to be used as a work vehicle. As a result, the work vehicle can use the work device to perform a predetermined task while traveling by the cart 1. Note that the cargo bed or the work device for performing a predetermined task is not limited to that which can be mounted on the mounting portion 161, and it is also possible to adopt an attachment arrangement in which the cargo bed or the work device for performing a predetermined task is attached to one of the parts of the cart 1 by a fastening mechanism such as a bolt or the like.

<Hardware Arrangement>

The cart ECU 11 is an ECU (Electronic Control Unit) that controls the operation of each component of the cart 1. As an example, the cart ECU 11 controls the travel unit and the power system of the cart 1, in other words, controls the body of the cart 1. The cart ECU 11 includes a processing unit 111, a storage unit 112 such as a RAM, a ROM, and the like, and an I/F unit 113 (interface unit) that relays the exchange of signals between the processing unit 111 and an external device. The processing unit 111 is a processor which is represented by a CPU and executes programs stored in the storage unit 112. The storage unit 112 stores, other than the programs to be executed by the processing unit 111, data and the like to be used for processing by the processing unit 111. Note that a plurality of ECUs may be arranged as the cart ECU 11. For example, as cart ECUs, an ECU for controlling the driving of the motors 10 and an ECU for controlling the operation of the engine 14 can be arranged so as to be capable of communicating with each other.

The processing unit 111 controls the operation of each component of the cart 1. For example, the processing unit 111 can drive each motor 10 via a motor driver (not shown) based on a control signal received from the autonomous control unit 2. Also, the processing unit 111 controls, for example, the operation of the engine 14 by processing shown in FIGS. 4, 5A, and 5B. In addition, the processing unit 111 transmits, for example, the detection results of various kinds of sensors 17 to the autonomous control unit 2 via the I/F unit 113.

The various kinds of sensors 17 can include various kinds of sensors for detecting information related to the vehicle body of the cart 1 and various kinds of sensors for detecting information related to the state of the periphery of the cart 1.

Examples of sensors for detecting information related to the vehicle body of the cart 1 are an oil level sensor and a fuel level sensor of the engine 14, a voltage sensor of the battery 13, a tilt sensor that detects the tilting of the cart 1, and the like. The tilt sensor can be, for example, an acceleration sensor or an angular velocity sensor.

Examples of sensors for detecting information related to the state of the periphery of the cart 1 are a vibration sensor, an external temperature sensor, a wind speed sensor, CO concentration sensor for detecting the concentration of carbon monoxide, a pressure sensitive contact sensor for detecting contact with an external device, a sensor for detecting the presence/absence of a person in the periphery, and the like. Examples of sensors for detecting the presence/absence of a person in the periphery are a camera, millimeter wave radar, LiDAR (Light Detection and Ranging), and the like. A GPS or the like that can obtain the position information of the cart 1 can also be adopted.

The cart 1 can include at least one of the sensors exemplified above as the various kinds of sensors 17.

The autonomous control unit 2 is a control unit that performs travel control of the cart 1 and is, for example, an ECU (Electronic Control Unit). The autonomous control unit 2 includes a processing unit 21, a storage unit 22 such as a RAM, a ROM, and the like, and an I/F unit 23 (interface unit) that relays the exchange of signals between the processing unit 21 and an external device. The processing unit 21 is a processor which can be represented by a CPU, and executes programs stored in the storage unit 22. The storage unit 22 stores, other than the programs to be executed by the processing unit 21, data and the like to be used for processing by the processing unit 21. The I/F unit 23 relays signals transmitted to/received from the cart ECU 11 on the side of cart 1 via wired communication or wireless communication.

The processing unit 21 performs travel control of the cart 1. In this embodiment, the processing unit 21 executes autonomous control on the cart 1. More specifically, the processing unit 21 can make a travel plan to set a target point, a path inside a warehouse, and the like, and control the operation of the cart 1 based on this travel plan. More specifically, the processing unit 21 can transmit, to the cart ECU 11, control signals related to the speed of movement, the direction of movement, and the like of the cart 1 based on the detection results of the various kinds of sensors 17 received from the cart ECU 11 and the above-described travel plan. The processing unit 111 of the cart ECU 11 can control the driving current and the like of each motor 10 based on each control signal from the processing unit 21. In this manner, the processing unit 21 executes autonomous travel control of the cart 1 via the processing unit 111.

<Example of Usage of System>

Figure 3:
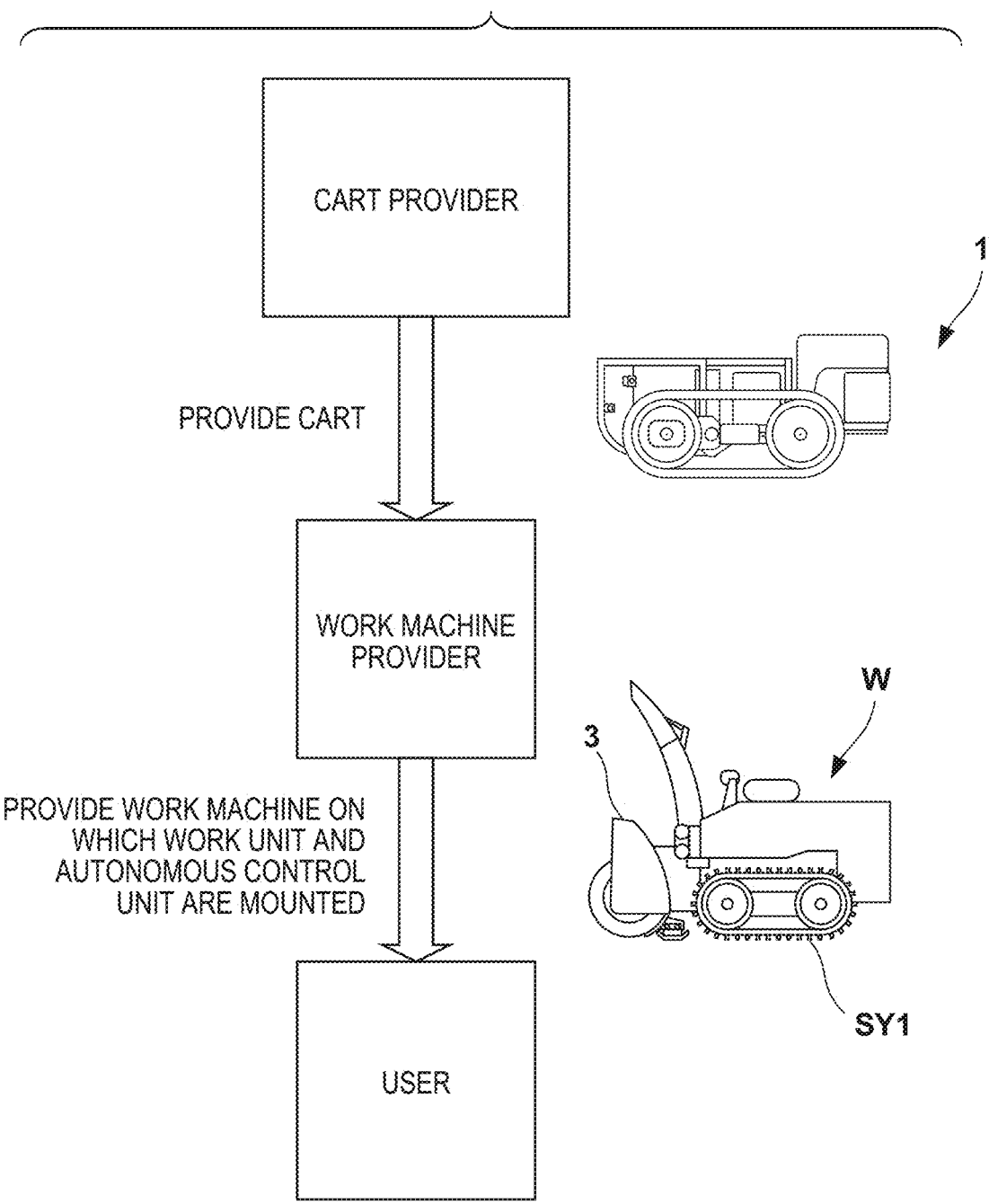
FIG. 3 is a view showing an example of usage of the travel system shown in FIG. 1.

FIG. 3 is a view showing an example of usage of the SY1 system shown in FIG. 1. In this example, a cart provider provides the cart 1 to a work machine provider. The work machine provider will form the SY1 system in which the autonomous control unit 2 has been mounted on the cart 1, and provide, to the user, a work machine W formed by mounting the work unit 3 for performing a predetermined task on the SY1 system.

In the example of usage shown in FIG. 3, the work machine provider need not develop the cart 1, which is the base portion on which the autonomous control unit 2 and the work unit 3 are mounted, and can provide the user with a service by developing only the autonomous control unit 2 and the work unit 3 to be mounted on the cart 1. In addition, according to this example of usage, since the autonomous control unit 2 can obtain the detection results of the various kinds of sensors 17 via the cart ECU 11 on the side of the cart 1, communication paths need not be constructed between the autonomous control unit 2 and the various kinds of sensors 17, and the system can be simplified. Hence, it will allow the work machine provider to reduce the development cost of service provision. Note that the example of usage described above is merely an example, and it is also possible to adopt another mode. For example, in a case (to be described later) in which a server that can communicate with the cart ECU 11 is to function as the autonomous control unit 2, the work machine provider may provide to the user a work machine in which the work unit 3 has been mounted on the cart 1 without the autonomous control unit 2.

<Processing Example of Cart ECU>

To continue travel by the motors 10, the battery 13 needs to be charged by generating power by the power generator 15 by operating the engine 14 in the SY1 system. On the other hand, it may be preferable not to operate the engine depending on the cart 1 and its periphery even in a case in which the charging of the battery 13 is required. Hence, in this embodiment, the operation of the engine 14 is controlled more effectively by the following processing.

Figure 4:
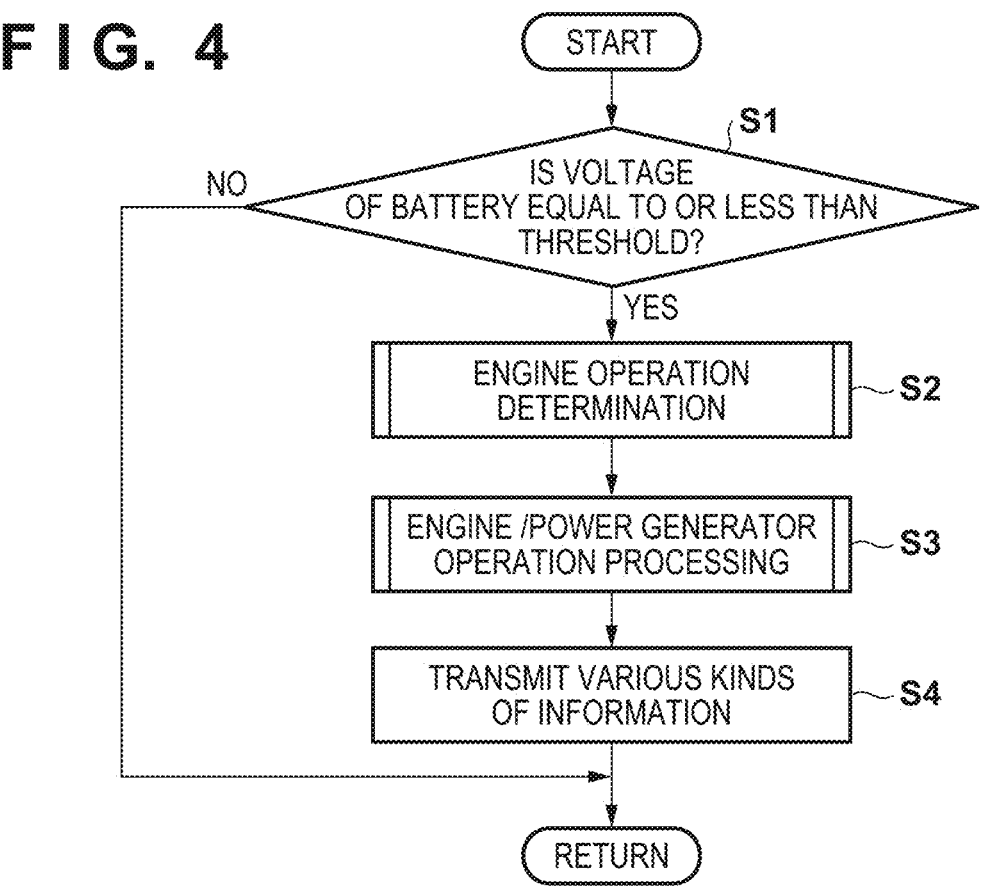
FIG. 4 is a flowchart showing an example of processing of a body control unit (cart ECU)

FIG. 4 is a flowchart showing an example of processing of the cart ECU 11. This flowchart shows the overall procedure of the engine operation control of the cart ECU 11. For example, the processing of this flowchart is implemented by the processing unit 111 reading out a program stored in the ROM in the storage unit 112 to the RAM in the storage unit 112 and executing the program. In addition, for example, the processing of this flowchart can be executed for each predetermined cycle in a case in which the engine 14 is not operated.

In step S1, the processing unit 111 confirms whether the voltage of the battery 13 is equal to or less than a threshold. If the voltage is equal to or less than the threshold, the processing unit 111 causes the process to advance to step S2. Otherwise, the processing of the flowchart ends. As a result, power generation will be performed by the following processing when the remaining charge amount of the battery 13 is small. Also, since power generation by the following processing will not be performed in a case in which the remaining charge amount of the battery is sufficient, it will be possible to suppress unnecessary power generation. The threshold can be set to fall within the range of 10 V to 12 V in a case in which the battery 13 is, for example, a lead acid battery. More specifically, threshold can be 10.5 V. In addition, in a case in which the battery 13 is another secondary cell battery such as a lithium ion battery or the like, an appropriate threshold can be set in correspondence to the type.

Note that the processing unit 111 can end the processing of the flowchart in a case in which, for example, the engine 14 cannot be started by the self-starter or the voltage of the battery has decreased to a level in which the self-starter itself cannot operate (NO in step S1). That is, the processing unit 111 can advance the process to step S2 in a case in which the voltage of the battery needs to be charged and falls within the range in which the engine 14 can be started by the self-starter. This can prevent a state in which the self-starter continues to rotate or transmit a signal even though the engine 14 cannot be started.

Figure 5A:
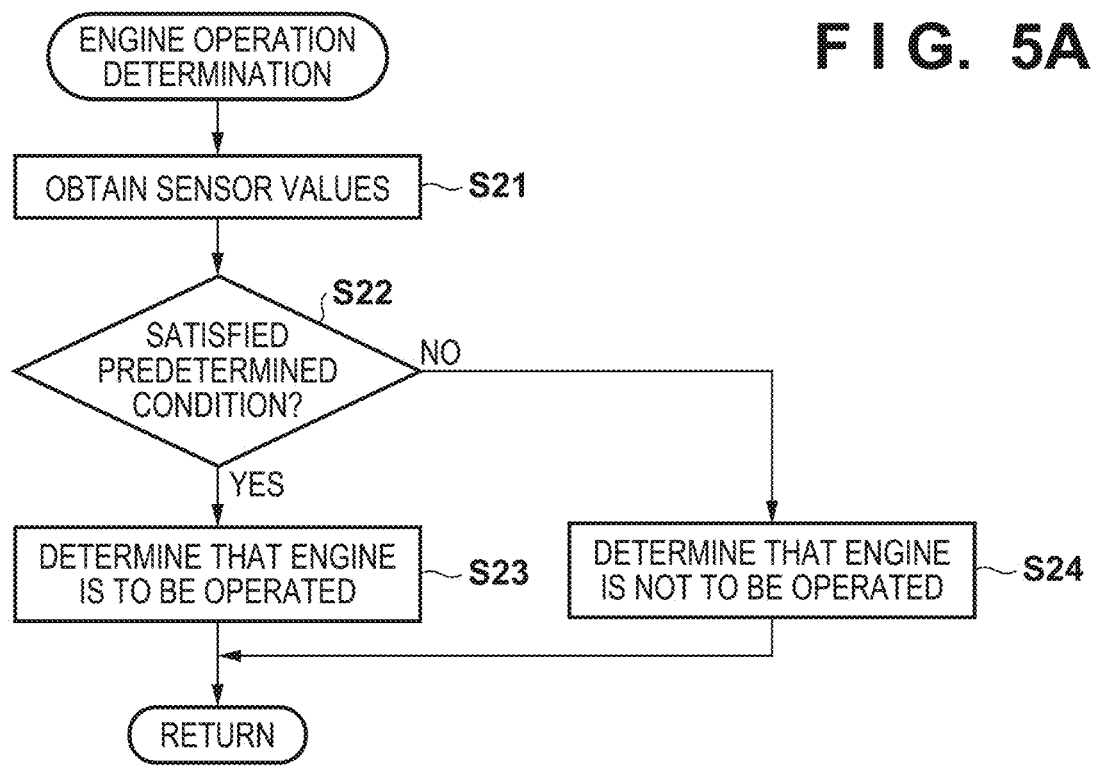
FIG. 5A is a flowchart showing an example of processing of the body control unit (cart ECU)

In step S2, the processing unit 111 determines whether to operate the engine. That is, the processing unit 111 functions as a determination unit for performing engine operation determination. An example of the determination processing will be described later (FIG. 5A). Note that since the processing unit 111 will perform the process of step S2 in a case in which "YES" is determined in the process of step S1, determination as to whether to operate the engine 14 will be performed in a case in which the voltage of the battery 13 is equal to or less than the threshold.

Figure 5B:
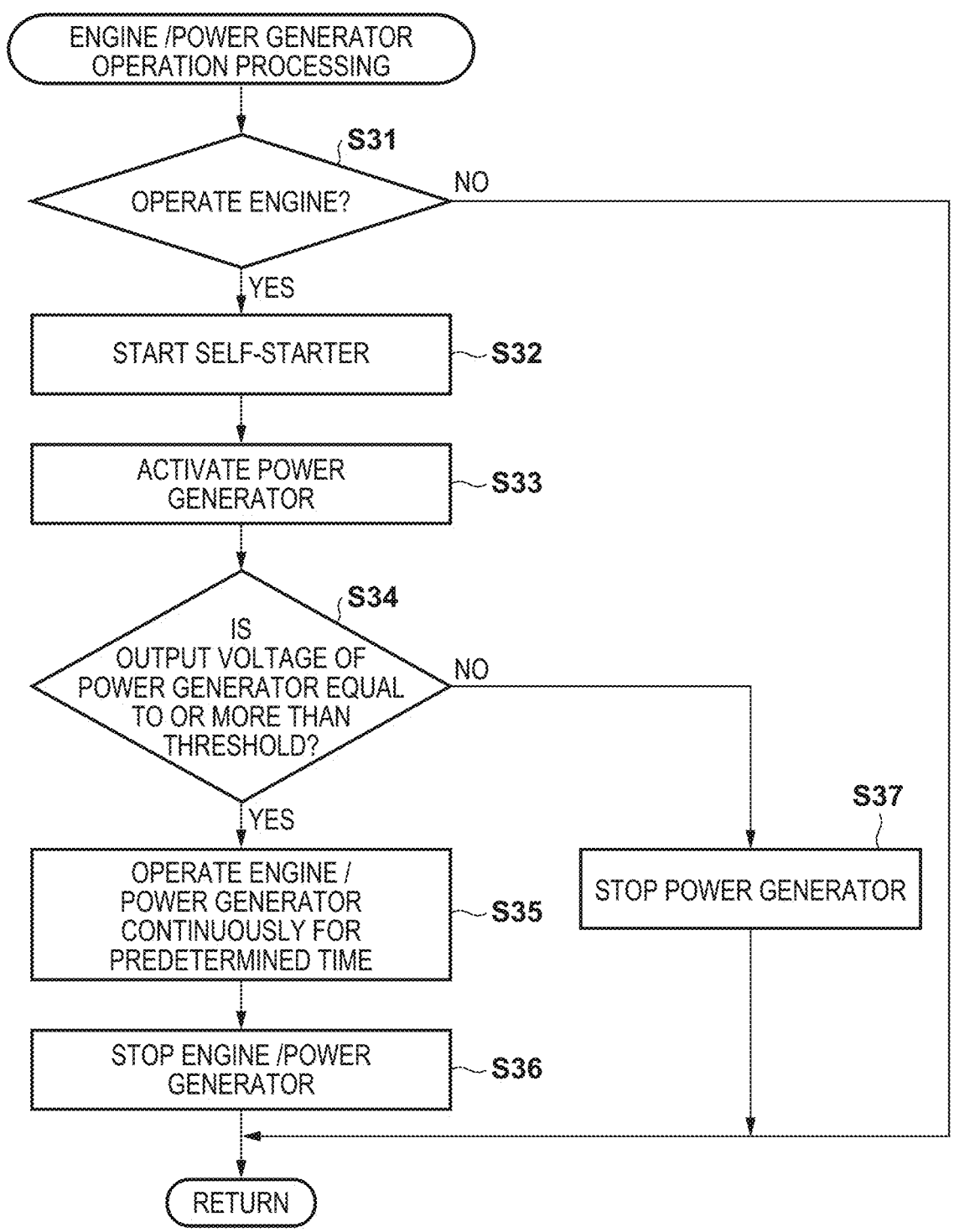
FIG. 5B is a flowchart showing an example of processing of the body control unit (cart ECU)

In step S3, the processing unit 111 performs processing to operate the engine 14/power generator 15. An example of this processing will be described later (FIG. 5B).

In step S4, the processing unit 111 transmits various kinds of information to the autonomous control unit 2. For example, the processing unit 111 transmits the determination result of the engine operation determination in step S2 to the autonomous control unit 2 via the I/F unit 113. That is, the processing unit 111 functions as a transmission unit that transmits this determination result to the autonomous control unit 2. This allows the autonomous control unit 2 to obtain the state of the operation of the engine 14 on the side of the autonomous control unit 2. In addition, the processing unit 111 can also transmit, as various kinds of information, the detection results of the various kinds of sensors 17 to the autonomous control unit 2.

Note that the timing at which the processing unit 111 transmits the various kinds of information to the autonomous control unit 2 can be changed appropriately. For example, the processing unit 111 can transmit the determination result to the autonomous control unit 2 after the processing of the engine operation determination has been performed in step S2. In addition, the processing unit 111 can transmit the detection results of the various kinds of sensors 17 for each predetermined control cycle.

FIG. 5A is a flowchart showing an example of processing of the cart ECU 11, and is a flowchart showing a more specific example of a subroutine of the process of step S2 of FIG. 4.

In step S21, the processing unit 111 obtains the sensor values of the various kinds of sensors 17.

In step S22, the processing unit 111 confirms, based on the obtained sensor values and the like, whether the engine 14 has satisfied a predetermined condition for operating the engine 14. If the predetermined condition is satisfied (YES in step S22), the processing unit 111 causes the process to advance to step S23 to determine that the engine 14 is to be operated. On the other hand, if the predetermined condition is not satisfied (NO in step S22), the processing unit 111 causes the process to advance to step S24 to determine that the engine is not to be operated. After the process of step S23 or step S24, the processing unit 111 ends the processing of this flowchart and returns to the processing of the flowchart of FIG. 4.

In one embodiment, the processing unit 111 can determine whether to operate the engine, based on whether the information related to the vehicle body of the cart 1 satisfies a predetermined condition. As a result, it will be possible to suppress an engine breakdown or an engine start failure due to an inappropriate operation. More specifically, the processing unit 111 can obtain, in step S21, the sensor value of at least one of the oil lever sensor of the engine 14, the fuel level sensor of the engine, the voltage sensor of the battery 13, and the tilt sensor of the cart 1. The processing unit 111 can determine whether the predetermined condition is satisfied based on the obtained sensor value.

More specifically, in a case in which the oil level sensor or the fuel level sensor is arranged to output either "OK" or "NG", the processing unit 111 can determine to operate the engine 14 if the detection result is "OK". Also, in a case in which the oil level sensor or the fuel level sensor is arranged to output a measurement value such as the liquid level or the like, the processing unit 111 may determine to operate the engine 14 if the measurement value is equal to or more than a threshold. In this manner, by determining whether to operate the engine 14, based on the state of the engine 14, it will be possible to suppress the engine 14 from operating in a state in which a failure or the like may occur.

In addition, the processing unit 111 can determine to operate the engine 14 in a case in which the detection result of the tilt sensor is equal to or less than a threshold. As a result, since the engine 14 will not operate in a state in which the cart 1 is greatly tilted, it will be possible to prevent the engine 14 from seizing. For example, the threshold can be set to a predetermined value that falls between 0° to 30°. More specifically, the threshold may be set to a predetermined value that falls between 0° to 20°. That is, the processing unit 111 can determine to operate the engine 14 in a case in which the tilt obtained based on the detection result of the tilt sensor is equal to or less than a predetermined value which falls within the range of 0° to 20°.

In one embodiment, the processing unit 111 can determine whether to operate the engine 14, based on whether the information related to the state of the periphery of the cart 1 satisfies a predetermined condition. As a result, it will be possible to control the operation of the engine in accordance with the state of the periphery.

More specifically, the processing unit 111 can determine whether to operate the engine 14, based on the information of the presence/absence of a person in the periphery of the cart 1.

That is, the processing unit 111 can determine, based on the detection result of the camera, the millimeter wave radar, the LiDAR, or the like, not to operate the engine 14 if a person is present in the periphery. As a result, it will be possible to suppress the operation of the engine 14 in a state that can cause discomfort due to engine sound, engine smell, or the like to a person in the periphery.

More specifically, the processing unit 111 can also determine whether to operate the engine 14, based on the information of the carbon monoxide concentration in the periphery of the cart 1. More specifically, the processing unit can determine not to operate the engine 14 in a case in which the detection result of the CO concentration sensor is equal to or more a threshold. As a result, it will be possible to prevent the CO concentration from rising in a state in which the cart 1 is indoors. The processing unit 111 can also determine not to operate the engine 14 in a case in which a person is present in the periphery of the cart 1 and the CO concentration is equal to or more than the threshold. The threshold of the CO concentration can be set to fall within, for example, a range of 10 ppm to 500 ppm.

FIG. 5B is a flowchart showing an example of processing of the cart ECU 11, and is a flowchart showing a more specific example of the subroutine of the process of step S3 of FIG. 4.

In step S31, as a result of the determination in step S2, if the processing unit 111 is to operate the engine 14 (YES in step S31), the process will advance to step S32. If the engine 14 is not to be operated (NO in step S31), the processing ends. Hence, if the process advances to NO in the branch of step S31, the processing of the flowchart of FIG. 4 will end without the operation of the engine 14.

In step S32, the processing unit 111 causes the self-starter of the engine 14 to start. For example, the processing unit 111 causes the self-starter to start operating for a predetermined time. Subsequently, in step S33, the processing unit 111 activates the power generator 15.

In step S34, the processing unit 111 confirms whether the output voltage of the power generator 15 is equal to or more than a threshold. If the output value is equal to or more than the threshold (YES in step S34), the process advances to step S35. If the output voltage is less than the threshold (NO in step S34), the process advances to step S37. In one embodiment, the engine 14 may not include sensors for detecting the state of the load and the rotation speed from the point of view of reducing the number of components or the like. In such a case, the processing unit 111 can confirm whether the engine 14 is operating based on the value of the output voltage of the power generator 15. More specifically, if the engine does not operate due some kind of reason even though the self-started has been started in step S32, the output voltage of the power generator 15 will not rise even if the power generator 15 is activated in step S33. Hence, the operation state of the engine 14 can be confirmed by the processing unit 111 based on the output voltage of the power generator 15. Note that in a case in which the engine 14 includes sensors for detecting the state of the load and the rotation speed, the processing unit 111 can advance the process to step S35 if the operation of the engine 14 can be confirmed based on these detection results or advance the process to step S37 if the operation of the engine cannot be confirmed. Note that the threshold of the output voltage can be set to, for example, a range of 12 V to 15 V. More specifically, the threshold of the output voltage can be set to 14.5 V. Note that in a case in which the type of the battery 13 is another type of secondary cell battery such as a lithium ion battery or the like, an appropriate threshold can be set in correspondence to this type.

In step S35, the processing unit 111 causes the engine 14 and the power generator 15 to operate continuously for a predetermined time. That is, if the operation of the engine 14 is confirmed by the process of step S34, the processing unit 111 will cause the engine 14 and the power generator 15 to continuously operate for a predetermined time.

In step S36, the processing unit 111 stops the engine 14 and the power generator 15 to end the processing of this flowchart, and returns to the processing of the flowchart of FIG. 4. On the other hand, if the process has advanced from step S34 to step S37, that is, if the operation of the engine 14 could not be confirmed in step S34, the processing unit 111 will stop the power generator 15 to end the processing of this flowchart, and return to the processing of the flowchart of FIG. 4.

Note that since the processing unit 111 can cyclically execute the processing of the flowchart of FIG. 4, the charging of the battery 13 will be performed again in the next control cycle in a case in which the charging of the battery 13 by the engine 14 and the power generator 15 is insufficient in step S35. The battery 13 can be charged sufficiently by repeating this operation.

As described above, according to this embodiment, since the processing unit 111 can determine whether to operate the engine 14, based on a predetermined condition, the engine 14 can be operated in accordance with the state. In addition, since the determination as to whether to operate the engine 14 is performed on the side of the cart 1, the relationship between the system and the autonomous control unit 2 can be simplified. Hence, the operation of the engine 14 can be controlled more effectively.

Other Embodiments

Although a system SY1 is formed by mounting an autonomous control unit 2 on a cart 1 in the above-described embodiment, it is also possible to adopt an example in which a system is arranged without mounting the autonomous control unit 2 on the cart 1. That is, it is possible to adopt an example in which the autonomous control unit 2 remotely performs the travel control of the cart 1. FIG. 6 is a view showing an example of the arrangement of a system SY2 according to an embodiment. Note that in the following description, the same reference symbols are used to denote components which are the same as those of the above-described embodiment, and a description thereof will be omitted.

In FIG. 6, the system SY2 includes one or a plurality of carts 1 and a server 4 that can communicate with each cart 1.

The server 4 manages the vehicle body information of each cart 1 and executes travel control on each cart 1. The server 4 can also be installed in, for example, an office or the like of a cart provider or a work machine provider. The server 4 includes a processing unit 41, a storage unit 42 such as a RAM, a ROM, and the like, and an I/F unit 43 (interface unit) that relays the exchange of signals between the processing unit 41 and an external device.

The processing unit 41 is a processor which is represented by a CPU, and executes programs stored in the storage unit 42. For example, the processing unit 41 can function as the autonomous control unit of each cart 1 by executing a program for the travel control of the cart 1. That is, the processing unit 41 remotely controls the travel of each cart 1. At this time, the processing unit 41 exchanges signals with a cart ECU 11 of each cart 1 via the I/F unit 43 and a network N. The processing unit 41 exchanges signals with the cart ECU 11 via, for example, wireless communication.

Note that a control unit that can perform travel control of the cart 1 can be mounted on the side of each cart 1, and the travel control of each cart 1 may be performed by the server 4 and the control unit on the side of the cart 1. For example, the server 4 can make a travel plan to set a target point, a travel path, and the like, and the control unit mounted on the cart 1 can control the speed of the movement, the direction of the movement, and the like of the cart 1 based on the travel plan.

The storage unit 42 stores, other than the programs to be executed by the processing unit 41, data and the like to be used by the processing unit 41 for processing. A database DB about the vehicle body information and the like of the cart 1 is also arranged in the storage unit 42.

The system SY2 can be used for, for example, a conveyance task and the like in a warehouse. That is, each cart 1 can be used as a conveyance vehicle by mounting a cargo bed or the like on the cart 1, and the server 4 can execute the travel control of the conveyance vehicle. As a result, in a case in which a conveyance task is to be performed in a warehouse by using a plurality of conveyance vehicles which can travel autonomously, the travel of each conveyance vehicle can be controlled on the side of the server 4 with consideration to avoiding collision between the conveyance vehicles.

In addition, in such a system arrangement as well, each cart 1 can use the cart ECU 11 to control the driving of an engine 14 for charging a battery 13. Hence, since the server 4 that functions as an autonomous control unit of the cart 1 will need not control the operation of the engine, it will be possible to simplify the arrangement of the server 4.

As described above, according to this embodiment, the operation of the engine 14 can be effectively controlled in a system in which travel control of each cart 1 is performed remotely by the server 4.

In addition, although the determination as to whether the engine is to be operated is performed by the cart 1 in the above-described embodiment, the cart 1 itself may determine whether traveling is possible. More specifically, a processing unit 111 of the cart ECU 11 may stop the travel if a predetermined condition is satisfied while the cart 1 is traveling. For example, the processing unit 111 may stop the travel if the sensor value of an angular velocity sensor does not satisfy a predetermined condition. This will allow the travel of the cart 1 to be stopped in a case in which the posture of the cart 1 is unstable or the like, and the possibility that the cart 1 will tumble or the like can be reduced. Furthermore, for example, the processing unit 111 may stop the travel if the sensor value of an acceleration sensor does not satisfy a predetermined condition. As a result, it will be possible to stop the travel of the cart in a case in which the cart 1 is in an unstable state such as a state in which a large vibration has been applied to the cart 1 or the like.

Also, although various kinds of information were obtained by various kinds of sensors 17 in the above-described embodiment, at least some of the pieces of information may be obtained from an external device by communication or the like. That is, the information obtainment method is not limited. For example, in a case in which a sensor such as a camera or the like is arranged in the travel region of the cart 1, the processing unit 111 may receive a detection result from this camera and determine the presence/absence of a person in the periphery based on the received detection result.

Also, although an example in which the autonomous control unit 2 performs autonomous travel control of the cart 1 has been described in the above-described embodiment, the autonomous control unit 2 may be a control device or the like that accepts input from an operator. For example, the autonomous control unit 2 may be a wireless communication device such as a remote control or the like, and may transmit a control signal based on the input from the operator to the processing unit 111. That is, the control related to the travel path of the cart 1 may be performed by autonomous control or may be performed manually based on an operation by the user by using a remote control. In addition, in one embodiment, a driver's seat may be provided on the cart 1, and control related to the travel of the cart 1 may be performed by a driving operation by the user. The processing unit 111 can control the travel unit and the driving force system of the cart 1, in other words, control the vehicle body of the cart 1 based on these control operations related to the travel path.

In addition, the SY1 system or the system SY2 according to each above-described embodiment can be applied to a conveyance task of carrying and conveying a target object. Although the battery 13 may need to be charged frequently because the travel distance tends to increase comparatively depending on the conveyance task, the processing unit 111 can charge the battery by the engine in accordance with the state. Furthermore, the processing unit 111 can effectively control the operation of the engine even in a state in which the cart is to move between indoors and outdoors and a state in which a person is performing a task in the periphery of the cart.

SUMMARY OF EMBODIMENTS

The above-described embodiments disclose at least a cart, a work machine, and a travel system as follows.

1. A cart (for example, 1) according to the above-described embodiments comprises:
an electric motor (for example, 10) configured to generate a travel driving force based on a control signal from an external control unit (for example, 2) configured to perform control related a travel path of the cart;
a battery (for example, 13) configured to supply power to the electric motor;
an engine (for example, 14) configured to drive a power generator (for example, 15) which is configured to be capable of charging the battery; and
a determination unit (for example, 111, S2) configured to determine whether the engine is to be operated, based on a predetermined condition.

According to this embodiment, the engine can be operated in accordance with the state because whether the engine is to be operated is determined based on a predetermined condition. Also, since the determination as to whether the engine is to be operated is performed on the side of the cart, the relationship between the system and the external control unit which is configured to perform control related to the travel path can be simplified. Hence, the operation of the engine can be controlled more effectively.

2. According to the above-described embodiments, the cart further comprises
a transmission unit (for example, 111, S4) configured to transmit a determination result obtained by the determination unit to the control unit.

According to this embodiment, the state of the operation of the engine can be obtained on the side of the control unit.

3. According to the above-described embodiments, the control unit can be mounted on the cart.

According to this embodiment, a cart that includes a control unit is provided.

4. According to the above-described embodiments, the control unit can execute autonomous travel control of the cart.

According to this embodiment, determination as to whether the engine is to be operated can be performed in the cart which is executing autonomous travel control.

5. According to the above-described embodiments, the determination unit determines (for example, S21-S24) whether the engine is to be operated, based on whether first information related to a vehicle body of the cart satisfies the predetermined condition.

According to this embodiment, since whether the engine is to be operated is determined based on information related to the vehicle body, it will be possible to suppress the engine from breaking down or having a start failure due to an inappropriate driving operation.

6. According to the above-described embodiments, the determination unit determines (for example, S21-S24) whether the engine is to be operated, based on whether second information related to a state of the periphery of the cart satisfies the predetermined condition.

According to this embodiment, the operation of the engine can be controlled in accordance with the state of the periphery.

7. According to the above-described embodiments, the second information includes information about the presence/absence of a person in the periphery of the cart.

According to this embodiment, it will be possible to suppress a state that can cause discomfort due to engine sound, engine smell, or the like to a person in the periphery.

8. According to the above-described embodiments, the second information includes information about the concentration of carbon monoxide in the periphery of the cart.

According to this embodiment, it is possible to prevent, for example, the carbon monoxide concentration from increasing indoors.

9. According to the above-described embodiments, the determination unit determines (for example, S1) whether the engine is to be operated in a case in which a voltage of the battery is not more than a threshold.

According to this embodiment, power generation by the engine can be performed when the remaining charge amount of the battery is small.

10. A work machine (for example, W) according to the above-described embodiments comprises:
a cart; and
a work unit (for example, 3) mounted on the cart and configured to perform a predetermined task.

According to this embodiment, a work machine that can control the operation of the engine in accordance with the state is provided.

11. According to the above-described embodiments, the predetermined task is a conveyance task for carrying and conveying a target object.

According to this embodiment, battery charging by the engine can be performed in accordance with a state in which a conveyance task is being performed over a comparatively long travel distance. In addition, the operation of the engine can be controlled effectively even in a state in which the cart is to move between indoors and outdoors and a state in which a person is performing a task in the periphery of the cart.

12. A travel system (for example, SY1, SY2) according to the above-described embodiments comprises a cart (for example, 1) and an external control unit (for example, 2) configured to perform control related to a travel path of the cart, wherein the cart comprises an electric motor (for example, 10) configured to generate a travel driving force based on a control signal from the external control unit, a battery (for example, 13) configured to supply power to the electric motor, an engine (for example, 14) configured to drive a power generator (for example, 15) which is configured to be capable of charging the battery, and a determination unit (for example, 111, S2) configured to determine whether the engine is to be operated based on a predetermined condition.

According to this embodiment, a travel system that can control the operation of the engine more effectively is provided.

13. According to the above-described embodiments, the travel system further comprises a server (for example, 4) configured to be capable of communicating with the cart, wherein the server includes the external control unit.

According to this embodiment, the operation of the engine can be controlled effectively in a system in which a server remotely performs the travel control of the cart.

The invention is not limited to the foregoing embodiments, and various variations/changes are possible within the spirit of the invention.

What is claimed is:

1. A cart comprising:
an electric motor configured to generate a travel driving force based on a control signal from an external control unit configured to perform control related a travel path of the cart;
a battery configured to supply power to the electric motor;
an engine configured to drive a power generator which is configured to be capable of charging the battery; and
a determination unit configured to determine whether the engine is to be operated, based on a predetermined condition,
wherein the determination unit determines whether the engine is to be operated, based on whether first information related to a vehicle body of the cart satisfies the predetermined condition.

2. The cart according to claim 1, further comprising:
a transmission unit configured to transmit a determination result obtained by the determination unit to the control unit.

3. The cart according to claim 2, wherein the control unit can be mounted.

4. The cart according to claim 1, wherein the control unit can execute autonomous travel control of the cart.

5. The cart according to claim 1, wherein the determination unit determines whether the engine is to be operated in a case in which a voltage of the battery is not more than a threshold.

6. A work machine comprising:
a cart defined in claim 1; and
a work unit mounted on the cart and configured to perform a predetermined task.

7. The machine according to claim 6, wherein the predetermined task is a conveyance task for carrying and conveying a target object.

8. A cart comprising:
an electric motor configured to generate a travel driving force based on a control signal from an external control unit configured to perform control related a travel path of the cart;
a battery configured to supply power to the electric motor;
an engine configured to drive a power generator which is configured to be capable of charging the battery; and
a determination unit configured to determine whether the engine is to be operated, based on a predetermined condition,
wherein the determination unit determines whether the engine is to be operated, based on whether second information related to a state of the periphery of the cart satisfies the predetermined condition.

9. The cart according to claim 8, wherein the second information includes information about the presence/absence of a person in the periphery of the cart.

10. The cart according to claim 8, wherein the second information includes information about the concentration of carbon monoxide in the periphery of the cart.

11. The cart according to claim 8, further comprising:
a transmission unit configured to transmit a determination result obtained by the determination unit to the control unit.

12. The cart according to claim 11, wherein the control unit can be mounted.

13. The cart according to claim 8, wherein the control unit can execute autonomous travel control of the cart.

14. The cart according to claim 8, wherein the determination unit determines whether the engine is to be operated in a case in which a voltage of the battery is not more than a threshold.

15. A travel system that comprises a cart and an external control unit configured to perform control related to a travel path of the cart,
wherein the cart comprises
an electric motor configured to generate a travel driving force based on a control signal from the external control unit,
a battery configured to supply power to the electric motor,
an engine configured to drive a power generator which is configured to be capable of charging the battery, and
a determination unit configured to determine whether the engine is to be operated based on a predetermined condition,
wherein the determination unit determines whether the engine is to be operated, based on whether first information related to a vehicle body of the cart satisfies the predetermined condition.

16. The travel system according to claim 15, further comprising:
   a server configured to be capable of communicating with the cart,
   wherein the server includes the external control unit.

\* \* \* \* \*